United States Patent [19]
Manske

[11] 3,986,075
[45] Oct. 12, 1976

[54] AUTOMATIC DEGAUSSING IN TELEVISION RECEIVER WITH VOLTAGE REGULATING TRANSFORMER

[75] Inventor: Hans E. Manske, Addison, Ill.

[73] Assignee: Zenith Radio Corporation, Chicago, Ill.

[22] Filed: July 2, 1975

[21] Appl. No.: 592,561

[52] U.S. Cl. .......................... 315/8; 317/157.5 TV
[51] Int. Cl.² ................................................ H01F 13/00
[58] Field of Search ................ 315/8; 317/157.5 TV

[56] References Cited
UNITED STATES PATENTS
3,798,493   3/1974   Manske .................................. 315/8

Primary Examiner—Eugene La Roche
Attorney, Agent, or Firm—Nicholas A. Camasto

[57] ABSTRACT

A color television receiver includes a voltage regulating transformer and resonating capacitor for supplying power to receiver circuitry and to a color picture tube subject to extraneous magnetization. An automatic degaussing circuit includes a degaussing coil adjacent to the picture tube, a thermally responsive element and a tuning capacitor, all series connected across a portion of the transformer secondary winding.

6 Claims, 1 Drawing Figure

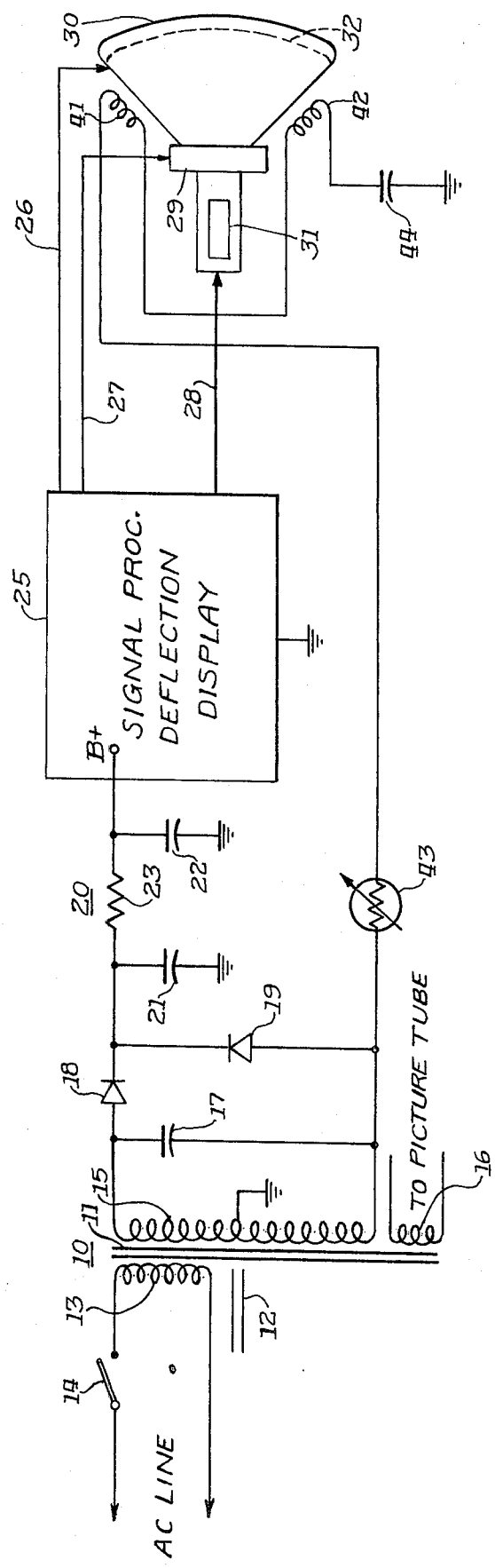

AUTOMATIC DEGAUSSING IN TELEVISION RECEIVER WITH VOLTAGE REGULATING TRANSFORMER

RELATED PATENT APPLICATION

The present application is related to but not dependent upon application Ser. No. 538,633, filed Jan. 3, 1975 to Hans E. Manske and assigned to Zenith Radio Corporation.

BACKGROUND OF THE INVENTION

This invention relates in general to color television receivers and in particular to means in color television receivers for automatically demagnetizing the color picture tube each time the receiver is energized from a "cold" start.

Nearly all modern color television receivers include some form of automatic degaussing circuitry for subjecting the color television picture to a high, initial amplitude, decaying alternating magnetic field for removing any residual magnetism which may be present in the permeable elements in the picture tube. As is well-known, residual magnetism has a detrimental effect on the color display of the picture tube. Such circuit arrangements generally comprise means for supplying a large initial amplitude, rapidly tapering alternating current to one or more degaussing coils located closely adjacent to the picture tube.

The simplest form of degaussing circuit includes a thermal element, exhibiting a low resistance when cold and a high resistance when hot, for tapering the current. Upon energization of the television receiver, maximum current flows through the degaussing coils because of the low resistance of the thermal element. The current flow rapidly raises the temperature of the thermal element, resulting in an increase in its resistance and consequent reduction of the current. This progressive reduction or tapering of the current gives rise to a similarly tapered alternating magnetic field about the picture tube, which removes any residual magnetism present in its permeable elements.

The amount of degaussing action obtained is, of course, a function of the magnetic field strength, which, in turn, is the product of the number of turns in the degaussing coils and the current through them. With conventional transformers a high initial current is readily obtainable and assures a sufficiently strong magnetic field to adequately degauss the tube. However, in receivers having voltage regulating transformers it is difficult to obtain a sufficiently intense magnetic field because the transformer tends to be current limiting. One solution is to place the degaussing circuit directly across the AC line. While such an arrangement solves the degaussing problem, it poses some safety problems because the degaussing coils (situated near the picture tube) are at line potential. In practice, an additional winding, magnetically coupled to the primary side of the transformer, is used to supply the degaussing current. This solution entails added cost in transformer manufacture and doesn't eliminate the possibility of line potential being present on the receiver chassis in the event of a breakdown between the transformer primary winding and the additional winding.

An example of the latter solution is shown in U.S. Pat. No. 3,798,493 issued Mar. 19, 1974 to Hans E. Manske and assigned to Zenith Radio Corporation. In that patent a separate degaussing winding is wound on the primary side of the voltage regulating transformer and is utilized to supply a degaussing circuit consisting of the series connection of a positive temperature coefficient resistance and a pair of degaussing coils.

Degaussing from the secondary side of a voltage regulating transformer is difficult because of the limited degaussing current available. In all situations, the size of the transformer and its configuration (number of windings and taps) and the amount of "copper" in the degaussing coils are important considerations in providing the consumer with a quality performing receiver at reasonable cost.

The above-mentioned copending application provides for degaussing of the color television receiver picture tube from the secondary side of a voltage regulating transformer. An additional winding, magnetically coupled to the primary winding or directly coupled to the AC line, is positioned on the shunted side of the core and therefore is magnetically coupled to the other secondary windings. This additional winding in conjunction with the secondary windings forms a conventional transformer.

The additional winding is coupled to the primary power source through a thermally responsive element distinct from the degaussing thermal element which effectively "disconnects" the additional winding after it reaches a certain temperature. Consequently, when the receiver is energized from a cold start the thermally responsive element manifests a low resistance and the additional winding is supplied with full primary power. The voltage regulating transformer functions as a conventional transformer and the normally regulated secondary windings provide degaussing current to the degaussing coil. The effect on the other secondary supplied circuitry is minimal. As the thermally responsive element heats up its resistance increases and restores power to the additional winding. Equilibrium is reached at a current value low enough not to interfere with normal regulated operation of the transformer.

OBJECTS OF THE INVENTION

The object of this invention is to provide an improved automatic degaussing circuit for a color television receiver having a voltage regulating transformer.

SUMMARY OF THE INVENTION

In accordance with the invention, a color television receiver includes a voltage regulating transformer and associated resonating capacitor for supplying regulated power. The receiver picture tube degaussing circuit includes a thermal element, a degaussing coil and an auxiliary tuning capacitor connected in series across a portion of the secondary winding of the transformer. The thermal element has a low resistance when cold and a high resistance when hot. Upon energization of the receiver from a "cold start", the auxiliary tuning capacitor resonates with the transformer for providing a large secondary current to the degaussing coils. As the temperature of the thermal element rises, the current is tapered, producing the appropriate decaying magnetic field for degaussing. After the degaussing interval, the main tuning capacitor resonates with the transformer for supplying normal load current to the television receiver.

With the invention, a number of attractive advantages are obtainable in color television receivers with voltage regulating transformers. Firstly, the receiver may be designed without fear that a primary winding fault in the transformer will give rise to a potential shock hazard. Secondly, the regulating transformer may be designed to supply acceptable levels of degaussing current without the need of an additional secondary winding, thus realizing a substantial economic benefit. Thirdly, for a given transformer supplying an "untuned" degaussing circuit, a substantial increase in degaussing current may be obtained. In a 13 inch diagonal receiver, the circuit of the invention yielded a 30 percent increase in degaussing current.

BRIEF DESCRIPTION OF THE DRAWING

The drawing discloses a partial schematic diagram of a color television receiver incorporating an automatic degaussing circuit constructed in accordance with the invention.

DESCRIPTION OF THE PREFERRED EMBODIMENT

Referring to the drawing, a voltage regulating transformer 10 includes a main core 11 and a shunting core 12. A primary winding 13 is connected to a source of AC line potential through a conventional on-off switch 14. Transformer 10 includes a secondary winding 15 having a grounded center tap and a filament winding 16 for supplying filament current to a picture tube. A tuning capacitor 17 is coupled across secondary winding 15.

The voltage regulating transformer is conventional and has its primary winding 13 loosely coupled to its secondary winding 15, with the transformer being tuned by capacitor 17 to the AC line frequency (60 Hz). The value of capacitor 17 is selected in conjunction with the transformer winding inductances, leakage reactance and the loading imposed by the television receiver circuitry. When operating within its design load current range, the transformer supplies a regulated potential. Under excessive current conditions, the resonant circuit stops resonating and the loose coupling of the transformer results in a substantial decrease in secondary voltage.

A pair of rectifiers 18 and 19, connected across secondary winding 15, supply a pi-connected filter network 20 consisting of a pair of capacitors 21 and 22 and a resistor 23. The rectifiers and filter combination function in a well-known manner to produce a full wave rectified voltage output at terminal B+.

Block 25 is labelled Signal Proc. Deflection and Display and should be understood to incorporate all of the well-known solid-state signal processing and picture tube deflection and display circuitry essential to a modern day color television receiver. A lead 26 from block 25 conveys the high voltage for operating a color picture tube 30. A lead 27 supplies deflection currents to an appropriate yoke structure 29 mounted on the neck of the picture tube. A lead 28 supplies video signals to the picture tube. Picture tube 30 includes a gun structure 31 and a shadow mask arrangement 32, indicated by a dashed line, both of which include permeable material susceptible to magnetization by, for example, the earth's magnetic field or stray magnetic fields. As mentioned, residual magnetism in these elements may have an adverse effect on the beam landings on the color picture tube phosphor screen with consequent color distortion in the displayed image.

The automatic degaussing circuit for removing such residual magnetism from the color picture tube comprises a series circuit including a thermal element 43 connected to one side of secondary winding 15, a pair of degaussing coils 41 and 42 located closely adjacent picture tube 30 and an auxiliary tuning capacitor 44. Since the center tap of secondary winding 15 is grounded, as is one terminal of capacitor 44, the degaussing circuit is connected across one-half of secondary winding 15. Thermal element 43 has a positive temperature coefficient of resistance. When it is in its cold state, that is, at ambient room temperature, it has a very low resistance. When it is in its hot state, during operation of the receiver, it has a very high resistance.

When the receiver is turned on by closure of switch 14, the impedance of the degaussing circuit is low. The circuit impedance consists of the low resistance of thermal element 43 and the low impedance of degaussing coils 41 and 42 and capacitor 44. Under series resonance conditions, the impedance is minimum and is essentially purely resistive.

Since the value of auxiliary tuning capacitor 44 is selected to tune the primary winding as well as the leakage inductance, the transformer is capable of supplying a large secondary current (series resonance). Further, the power requirements of the other television receiver circuitry are minimal. In a solid-state receiver, the solid-state devices do not consume much energy; the bulk of the receiver power is consumed by the picture tube which is not enabled for a few seconds after receiver turn-on.

As degaussing current flows through thermal element 43, its resistance increases, and reduces the current flow through the degaussing coils. This results in a tapering of the current through the degaussing coils, corresponding decay of the degaussing field about picture tube 30, and consequent demagnetization of the permeable material therein. The entire degaussing action occurs in a time interval before the picture tube begins to produce beam current. Thus the viewer is unaware of the degaussing action.

Under steady-state receiver operation, the resistance of thermal element 43 is high enough to effectively disconnect the degaussing circuit from the transformer (except for the small current required to maintain or stabilize the temperature of thermal element 43). Of course, under normal conditions, the secondary of the transformer and the normal load imposed by the receiver circuitry is tuned by turning capacitor 17 and the voltage regulating action of the transformer is undisturbed.

In a practical arrangement, the cold resistance of thermal element 43 is approximately 6 ohms and its hot resistance approximately 4,500 ohms. The degaussing coils have a total of 80 turns of No. 22 aluminum wire and the capacitance of auxiliary tuning capacitor 44 is 50 microfarads. Preferably, electrolytic capacitor 44, which is required to handle fairly large surges of alternating current, is of the nonpolarized type housed in a metal can. As may be seen from the schematic, one side of the metal can may be connected to receiver ground which makes for a very convenient installation.

Thus, it may be seen that the degaussing circuit of the invention is capable of supplying substantial current to the demagnetizing coils of the picture tube from the secondary winding of a voltage regulating transformer.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In combination in a color television receiver including a resonant transformer and associated tuning capacitor supplying voltage-regulated power to signal processing, deflection and display circuitry, said receiver including a color picture tube having permeable material susceptible to undesirable magnetization; an automatic degaussing circuit arrangement comprising; a degaussing coil adjacent said color picture tube for developing a degaussing magnetic field in the vicinity of said permeable material upon energization of said receiver from a cold start; a thermal element having a low resistance when cold and a high resistance when hot; and an auxiliary tuning capacitor in circuit with said resonant transformer, said thermal element and said degaussing coil for changing the tuning of said resonant transformer during the degaussing interval.

2. An automatic degaussing circuit as set forth in claim 1, wherein said auxiliary tuning capacitor is selected to resonate the degaussing circuit at approximately the power line frequency.

3. An automatic degaussing circuit as set forth in claim 2, wherein said degaussing circuit is series-tuned.

4. An automatic degaussing circuit as set forth in claim 3, wherein said resonant transformer has a secondary winding; said associated tuning capacitor and said degaussing circuit being coupled across different parts of said secondary winding.

5. An automatic degaussing circuit as set forth in claim 4, wherein said television receiver includes a full wave rectifier connected across a center tapped portion of said secondary winding; said associated tuning capacitor is coupled across the full secondary winding and said degaussing circuit is coupled across a half of said center tapped portion.

6. An automatic degaussing circuit as set forth in claim 5, wherein said center tap is connected to ground potential and said auxiliary tuning capacitor is a can-type nonpolarized electrolytic capacitor.

* * * * *